UNITED STATES PATENT OFFICE.

OSCAR GÜNTHER AND LEOPOLD HESSE, OF ELBERFELD, ARTHUR ZART, OF VOHWINKEL, AND HUGO SCHWEITZER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

982,955.   Specification of Letters Patent.   Patented Jan. 31, 1911.

No Drawing.   Application filed June 29, 1910.   Serial No. 569,490.

*To all whom it may concern:*

Be it known that we, OSCAR GÜNTHER and LEOPOLD HESSE, residing at Elberfeld, and ARTHUR ZART and HUGO SCHWEITZER, residing, respectively, at Vohwinkel, near Elberfeld, and Elberfeld, Germany, doctors of philosophy, chemists, citizens of the German Empire, have invented new and useful Improvements in Dyes, of which the following is a specification.

This invention relates to the preparation of new azo dyestuffs which are obtained by combining in acid solution the diazo compounds of aminosulfonic acids, such as sulfanilic acids, 2.5-dichloro-4-sulfanilic acid, 2-naphthylamin-3.6-disulfonic acid, sulfonic acids of toluidins, xylidins and aminophenol ethers with 2-arylamino-8-naphthol-6-sulfonic acids.

The new dyestuffs are after being dried and pulverized in the shape of their sodium salts dark powders yielding upon reduction with stannous chlorid and hyrochloric acid a sulfonic acid of an aromatic amin and an 1-amino-2-arylamino-8-naphthol-6-sulfonic acid. They produce on wool from an acid bath red to violet shades of good fastness to light and to milling. Part of the dyes can be increased in fastness by chroming.

In order to illustrate the new process more fully the following example is given, the parts being by weight:—173 parts of meta-sulfanilic acid are diazotized by means of sodium nitrite and hydrochloric acid and the diazocompound is then added at 3° C., to an aqueous solution cooled to 5° C. and which has to be stirred of 343 parts of 2-meta-xylylamino-8-naphthol-6-sulfonic acid, which solution shows only a slightly acid reaction on congo paper.

The dyestuff is isolated by salting out. It is after being dried and pulverized in the shape of its sodium salt a brown powder soluble in water with a red color and soluble in concentrated sulfuric acid with a red color; yielding upon reduction with stannous chlorid and hydrochloric acid meta-sulfanilic acid and 1-amino-2-meta-xylylamino-8-naphthol-6-sulfonic acid; and dyeing wool from an acid bath a red fast to light and to milling. Similar shades are obtained on using instead of 2-meta-xylylamino-8-naphthol-6-sulfonic acid, other of the above mentioned derivatives of 2-amino-8-naphthol-6-sulfonic acid, *e. g.* paratolyl-, xylyl-, para-anisidyl-, phenyl-meta-carboxyphenyl-2-amino-8-naphthol-6-sulfonic acid.

We claim:—

1. The herein described new azo dyestuffs obtainable from sulfonic acids of amins and 2-arylamino-8-naphthol-6-sulfonic acids, which are after being dried and pulverized in the shape of their sodium salts dark powders; yielding upon reduction with stannous chlorid and hydrochloric acid a sulfonic acid of an aromatic amin and an 1-amino-2-arylamino-8-naphthol-6-sulfonic acid; and dyeing wool from red to violet shades, substantially as described.

2. The herein described new azo dyestuff obtainable from meta-sulfanilic acid and 2-meta-xylylamino-8-nahpthol-6-sulfonic acid, which dye is after being dried and pulverized in the shape of its sodium salt a dark powder soluble in water with a red color and soluble in concentrated sulfuric acid with a red color; yielding upon reduction with stannous chlorid and hydrochloric meta-sulfanilic acid and 1-amino-2-meta-xylylamino-8-naphthol-6-sulfonic acid; and dyeing wool red shades, substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]
HUGO SCHWEITZER. [L. S.]

Witnesses:
CHAS. J. WRIGHT,
WALTER VONNEGUT.